May 4, 1965 O. C. KINDORF 3,181,826
FRICTION PIPE STRAP
Filed Oct. 14, 1963
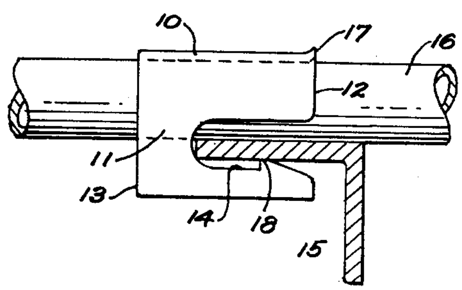
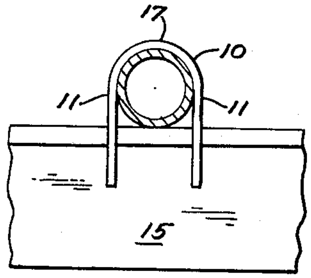
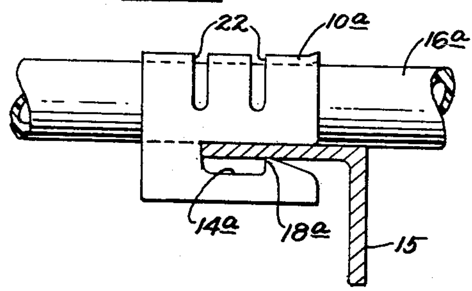
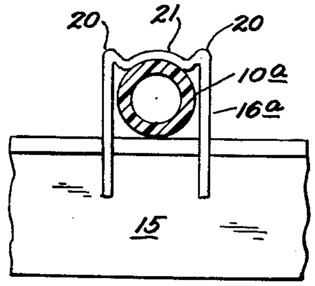
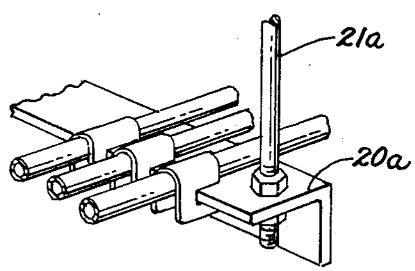
INVENTOR.
ORLAN C. KINDORF
BY
Fryer & Tjensvold
ATTORNEYS

United States Patent Office 3,181,826
Patented May 4, 1965

3,181,826
FRICTION PIPE STRAP
Orlan C. Kindorf, 500 Mountain Ave., Piedmont, Calif.
Filed Oct. 14, 1963, Ser. No. 315,879
6 Claims. (Cl. 248—72)

This invention relates to pipe straps or fasteners for securing pipes, tubing, electrical conductors and the like to a flat metal member or to a relatively flat part of a structural beam or bracket used as a pipe support.

It is an object of the present invention to provide a very low cost pipe strap capable of being easily and quickly installed into its operative position and adapted to securely hold a pipe or tubular object in place on a supporting surface without injuring or marring the securing member.

Another object of the invention is to provide a pipe strap which occupies very little space particularly at the sides of a secured pipe whereby a plurality of pipes in parallel arrangement may be placed close together.

Further objects and advantages of the invention are made apparent in the following specification wherein the invention is described in detail by reference to the accompanying drawing.

In the drawing:

FIG. 1 is a view in side elevation of a pipe strap embodying the present invention illustrated as securing a pipe to an angle shaped support;

FIG. 2 is a view in rear elevation of the assembly shown in FIG. 1;

FIG. 3 is a view like FIG. 1 showing a modified form of the pipe strap;

FIG. 4 is a rear elevation of the pipe strap shown in FIG. 3; and

FIG. 5 is a perspective view of a group of pipe straps in use.

In the form of the invention shown in FIGS. 1 and 2, the pipe strap is made of a rectangular metal plate, preferably steel, bent into a U-shape having a curved portion 10 conforming to one half of the pipe to be secured and two flat rectangular side walls 11 with forward edges 12 and rear edges 13. The forward edges are provided with rearwardly extending recesses or cutaway portions 14 to embrace a flat metal piece or support upon which the pipe rests, here shown as one leg of an angle iron 15. The forward edge of the curved portion which embraces the pipe shown at 16 is outwardly flared as at 17 just sufficiently to permit the strap to be moved forwardly into the assembled position shown without danger of scratching or marring the pipe.

The lower edge of each of the openings 14 which are identical on both side walls of the strap is provided with a hardened barb or tooth. To assemble the strap into the position shown, it is placed over the pipe to the left of the angle 15, as viewed in FIG. 1, and then driven into place as by a hammer blow which causes the lower portions of the side walls beneath the slot openings 14 to spring downwardly sufficiently to permit the barb 18 to slide over the lower surface of the flat member which supports the pipe. The barb is biased upwardly by the resiliency of the metal side wall so it tends to bite into the metal support and resist retraction or removal of the strap. Furthermore when the strap is driven into place by a blow at the lower portion of the rear edge 13, impact of the inner edge of the opening 14 with the edge of the supporting plate which it embraces creates a shock, the reaction of which tends to bend the lower portion of the side wall just sufficiently to cause the barb to bite into the metal and further insure resistance to removal of the strap.

The strap is formed of relatively thin metal and since its side walls are flat, pipes or conduits may be secured in very close relationship to each other on a support as is evident from FIG. 5 of the drawing illustrating several pipes secured by straps of the present invention to a supporting member 20*a* which may be suspended as by hanger rods, one of which is shown at 21*a*.

A modified form of the invention is shown in FIG. 3 of the drawing which illustrates a strap of the kind shown in FIG. 1 designed for use where expansion and contraction of the secured pipe is anticipated. In this form of the invention, the opening 14*a* which embraces the support is narrower than that shown in FIG. 1 so that the upper edges of the opening rest upon the support while the barb 18*a* acts to retain the strap in place without exerting pressure on the secured pipe. Thus the strap may be made slightly larger than required to closely embrace the pipe and space remains to permit movement of the pipe as it expands and contracts.

Another modification is best illustrated in FIG. 4 wherein the strap 10*a* is shown as embracing a plastic tube 16*a* and is so designed that it may closely embrace and grip the tube without danger of scuffing the outer surface thereof. This type of strap is also desirable for securing insulated electric conductors where scuffing or abrasion of the exterior surface is undesirable. As shown in FIG. 4, the strap is of slightly greater size than required for a close fit but has a contoured upper surface providing upwardly extending ears 20 which may be urged toward each other after the strap is installed to cause a curved portion 21 to move downwardly into gripping contact with the tube or conductor. This deforming action may be facilitated by slotting the upper portion of the strap as shown at 22 in FIG. 3 thus reducing the amount of metal which must be distorted in order to provide the desired gripping action.

The term "pipe" as used herein and in the appended claims is to be taken as inclusive of conduits, tubes, conductors and any and all cylindrical or substantially cylindrical elements required to be secured into place.

I claim:

1. A pipe strap comprising a metallic member of U-shaped cross section having substantially rectangular flat side walls, said side walls having openings entering them from one of their edges in positions to embrace a flat supporting member against one side of which a pipe rests while the member embraces, the pipe, and a barb extending from an edge of each opening for engagement with the other side of said flat supporting member.

2. The combination of claim 1 in which the barbs are close to the edges which the openings enter and the opposite edges extend beyond the support sufficiently to receive a hammer blow for driving the strap over the supporting member and for urging the barb into its surface.

3. The combination of claim 1 with an edge of the curved portion of the U-shaped member flared to prevent scuffing of a pipe upon movement of the member lengthwise in contact with the pipe.

4. The combination of claim 1 in which the edges of the openings opposite the barbs engage the side of the flat supporting member against which the pipe rests so that the strap is self supporting on the flat member and the pipe is free to move with respect to the support and the strap.

5. The combination of claim 1 with the U-shaped portion of the strap bent to provide outstanding ears which may be compressed toward each other to cause the strap to tightly embrace the pipe.

6. The combination of claim 5 with spaced slots formed through the curved portion and the ears to facilitate bending.

References Cited by the Examiner

UNITED STATES PATENTS

| | | | |
|---|---|---|---|
| 2,332,855 | 10/43 | Jones | 248—316.5 |
| 2,354,404 | 7/44 | Sayles | 248—72 |
| 2,834,566 | 5/58 | Bower | 248—226 X |
| 2,869,812 | 1/59 | Hamel | 248—226 X |
| 2,885,168 | 5/59 | Silverman | 248—71 |

CLAUDE A. LEROY, *Primary Examiner.*